Jan. 4, 1955          H. W. JUSTICE          2,698,492
SCARIFIER ATTACHMENT TO GRADING MACHINES
Filed Dec. 8, 1950
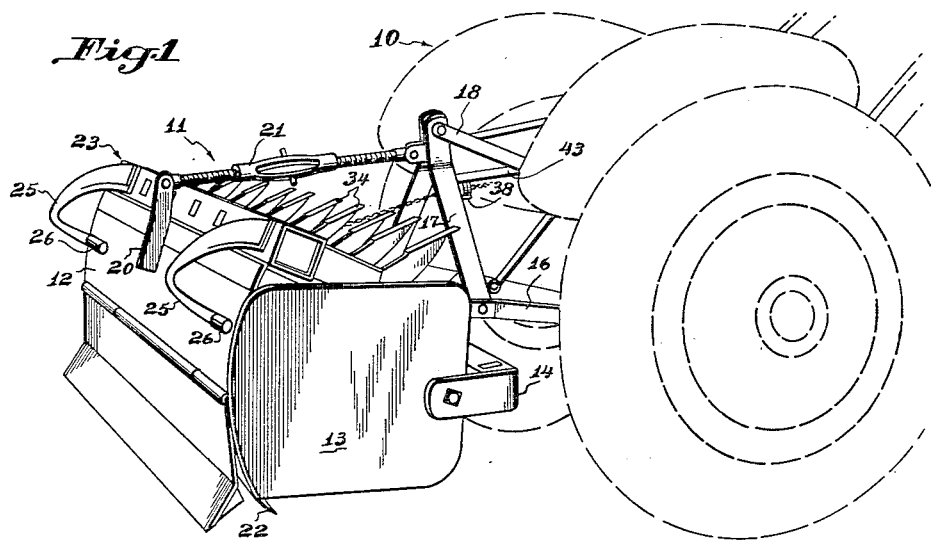
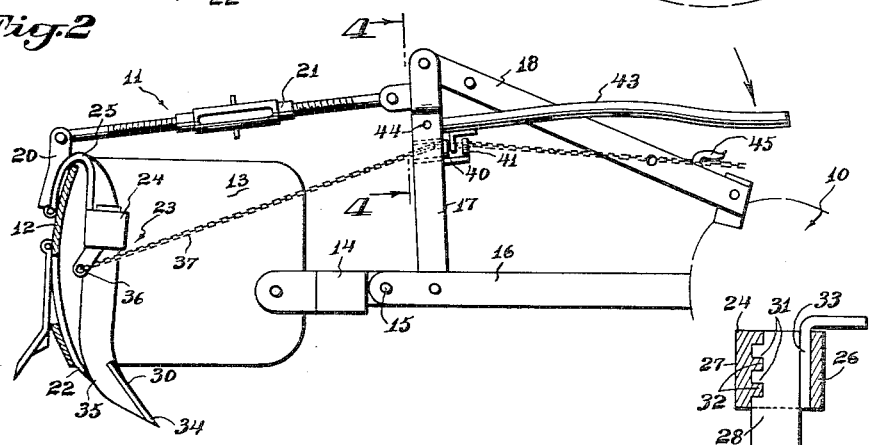
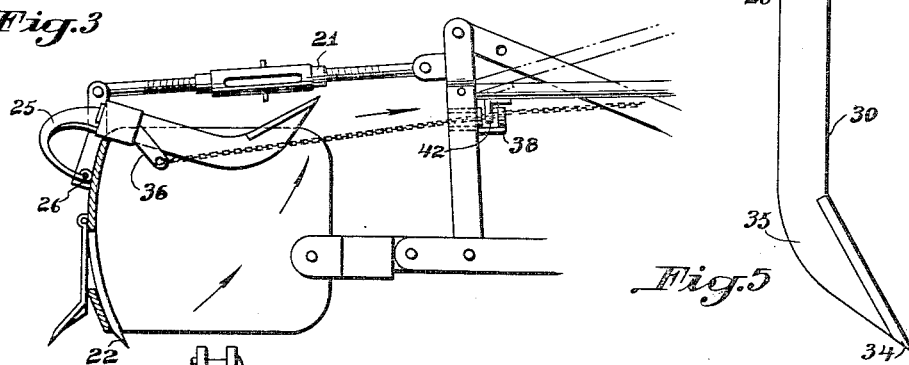
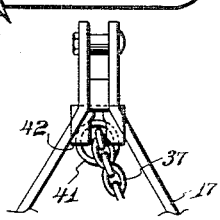
INVENTOR.
HOWARD W. JUSTICE.
BY
Attorney.

2,698,492

SCARIFIER ATTACHMENT TO GRADING MACHINES

Howard W. Justice, Compton, Calif.

Application December 8, 1950, Serial No. 199,830

1 Claim. (Cl. 37—145)

This invention relates to grading machinery and more especially to a scarifier attachment to grading machines.

An object of the invention is to provide a simple, practical and efficient scarifier attachment to grading machines.

Another object of the invention is to provide a scarifier attachment of the character described that can be readily moved into and out of operative position by the operator of the grader.

Another object of the invention is to provide a grading machine scraper and scarifier combination such that the operation of the scarifier is aided by the scraper blade.

A further object of the invention is to provide a scarifier attachment that is adapted to be applied to any earth moving vehicle including ditchers and trenchers.

An additional object of the invention is to provide a scarifier and scraper construction such that the scarifier teeth extend downwardly at an angle below the scraper blade edge so that the scarifier will draw the scraper down into material more effectively than without this scarifier construction.

Other objects and advantages will appear and be brought out more fully in the following specification, reference being had to the accompanying drawing wherein:

Fig. 1 is a perspective view of a grading machine incorporating a novel scarifier attachment embodying my invention.

Fig. 2 is a side elevation view partly broken away of the same, showing the scarifier in operative position.

Fig. 3 is a view similar to Fig. 2 showing the scarifier in inoperative position.

Fig. 4 is a fragmentary view as seen from the line 4—4 of Fig. 2.

Fig. 5 is an enlarged partial side elevation view of one of the scarifier teeth and the supporting means thereof.

Referring more particularly to the drawing, 10 indicates a tractor or other vehicle supplying tractive power to which is connected a grading machine 11 of the scraper type, having a scraper blade 12 having a pair of side plates 13 connected to a forward transverse frame 14. Frame 14 is pivoted at 15 to a yoke structure 16 secured to tractor 10 and a Y-frame 17 extends upwardly from frame structure 16 and is connected by link 18 to the tractor 10. An arm 20 extending upwardly from blade 12 is connected by an extension link 21 to frame 17 for changing the angle of blade 12. Blade 12 has a scraping edge 22.

A scarifier indicated generally at 23 comprises a transverse frame 24 to which are secured a pair of arcuately shaped brackets 25 which have pivot bearing mounting 26 on the back side of blade 12 preferably at a point adjacent the upper edge of the blade. Frame 24 may consist of front and rear spaced plates 26 and 27 (Fig. 5) between which are positioned the shanks 28 of a plurality of scarifier teeth 30. Shanks 28 have a plurality of notches or slots 31, and plate 27 may be formed with a plurality of tongues 32 for interfitting in notches 31, and suitable wedges or other locking members 33 may be positioned between shanks 28 and plate 26. The pointed ends 34 of the teeth 30 are shown extending a substantial amount below edge 22 of scraper blade 12, and teeth 30 have a heel portion 35 which may be engaged by the lower edge of blade 12 so that the tractive effort from the tractor 10 may be transmitted through blade 12 to the teeth 30 at a relatively low point on the teeth for most effective action.

An arm 36 extends downwardly from frame 24 and a chain 37 is secured to the lower end of arm 36 and extends through a guide device 38 secured to Y-frame 17. Device 38 includes a tube 40 and a ring 41 spaced therefrom, chain 37 being passed through both the tube and the ring. A slotted locking plate 42 is secured to a lever 43 pivoted at 44 to Y-frame 17, the lever extending forwardly and having a handle accessible to the operator of the traction vehicle. Slotted plate 42 is so constructed that the slot thereof may receive a link of chain 37 and the plate will function as a lock to hold the chain. An auxiliary hook 45 is positioned on frame member 18 in which the slack forward end of the chain may be accommodated. Chain 37 may be hooked to hook 45 with the blade 12 in elevated position, and when the blade is lowered chain 37 will pull scarifier 23 upwardly to the position shown in Figures 1 and 3.

The operation of the invention should be clear from the foregoing description. Figure 2 shows the position of the scarifier 23 during scarifying operation. Inasmuch as toothed tips 34 are a substantial distance below scraper edge 22, an effective scarifying action can be obtained without an appreciable accumulation of dirt or debris in the cavity of the blade 12 which is seen to be an arc of a true circle. When it is desired to operate the grader as a scraper only, the operator can shift the scarifier from the position shown in Figure 2 to that shown in Figure 3 by actuating lever 43 to release plate 42 from chain 37, and thereupon by a pull on the chain the scarifier will be rotated on pivots 26, and upon a release of lever 43, locking plate 42 will engage a link of chain 37 and the scarifier will be locked in the position shown in Figure 3. When the scraper is thus operated without the scarifier teeth in lowered position, the full face of the blade 12 is used and the scarifier does not in any way interfere with the scraper. The mounting of teeth 30 in frame 24 is such as to provide several adjustable positions of the teeth so that the effective depth of the cut of the teeth may be effected. Also, teeth locking elements 33 may be changed so as to be curved or bevel-shaped so that the angle the teeth make with frame 24 may be varied as desired.

It will be understood that the foregoing description is illustrative rather than restrictive of my invention and that changes and modifications may be made without departing from the spirit and scope of the subjoined claim. Equivalent elements may be substituted for those shown, such as a cable or other link mechanism in place of chain 37.

Having described my invention what I claim and desire to secure by Letters Patent is:

In a grading machine having a frame and an arcuate blade, the combination of a transverse tool beam pivotally secured to said blade at an axis displaced from the surface of the blade, a plurality of teeth secured to said tool beam, a beam rotating chain connected to said tool beam and extending forwardly, and a lock for said chain on said frame, said lock including a lever accessible to the operator of the machine and a chain engaging yoke secured to said lever, said frame having guide means for said chain adjacent said lock.

References Cited in the file of this patent

UNITED STATES PATENTS

| Number | Name | Date |
|---|---|---|
| 643,240 | Shuart | Feb. 13, 1900 |
| 696,898 | Butler | Apr. 1, 1902 |
| 823,872 | Jones | June 19, 1906 |
| 1,550,858 | Winsor | Aug. 25, 1925 |
| 2,262,415 | Williams et al. | Nov. 11, 1941 |
| 2,281,928 | Fletcher | May 5, 1942 |
| 2,362,407 | Ruddock | Nov. 7, 1944 |
| 2,510,445 | Way | June 6, 1950 |
| 2,566,562 | Hale | Sept. 4, 1951 |